(12) United States Patent
Du

(10) Patent No.: US 12,371,341 B2
(45) Date of Patent: Jul. 29, 2025

(54) PREPARATION METHOD OF AN ANODE MATERIAL FOR LITHIUM-ION BATTERIES

(71) Applicant: Huiyang (Guizhou) New Energy Materials Co., Ltd, Guizhou (CN)

(72) Inventor: Huiyu Du, Guizhou (CN)

( * ) Notice: Subject to any disclaimer, the term of this patent is extended or adjusted under 35 U.S.C. 154(b) by 501 days.

(21) Appl. No.: 17/973,232

(22) Filed: Oct. 25, 2022

(65) Prior Publication Data
US 2023/0331577 A1    Oct. 19, 2023

(30) Foreign Application Priority Data
Apr. 17, 2022 (CN) .......................... 202210400775.2

(51) Int. Cl.
*C01G 23/00* (2006.01)
*C01G 23/08* (2006.01)
*H01M 10/0525* (2010.01)

(52) U.S. Cl.
CPC ........... *C01G 23/002* (2013.01); *C01G 23/08* (2013.01); *H01M 10/0525* (2013.01); *C01P 2006/40* (2013.01)

(58) Field of Classification Search
CPC .. C01G 23/002; C01G 23/08; H01M 10/0525
USPC .................................................... 429/231.95
See application file for complete search history.

(56) References Cited

FOREIGN PATENT DOCUMENTS

CN          113937257 A   *   1/2022

* cited by examiner

*Primary Examiner* — James M Erwin

(57) ABSTRACT

The invention discloses a preparation method of an anode material for lithium-ion batteries, comprising: dispersing tetrabutyl titanate in glycerol solvent and adding hexadecyl trimethyl ammonium bromide solution, adding tetramethyl-ammonium hydroxide to adjust Ph; then adding ammonium fluoride solution, heating at 150-200° C. for 1~6h, the product was centrifuged, washed, and dried in vacuum to obtain titanium/nitrogen/fluorine-doped porous titanium dioxide; preparing the titanium/nitrogen/fluorine-doped porous titanium dioxide organic solution, and then adding lithium salt solution, then adding graphite, mixing uniformly, and spray drying to obtain porous lithium titanate-coated graphite composites; taking porous lithium titanate-coated graphite composites and ammonium fluoride, placing them in a tube furnace, heating them under the protection of argon, and then heating them up to carbonization. The invention can improve the first-time efficiency of graphite composites and their power performance.

2 Claims, 1 Drawing Sheet

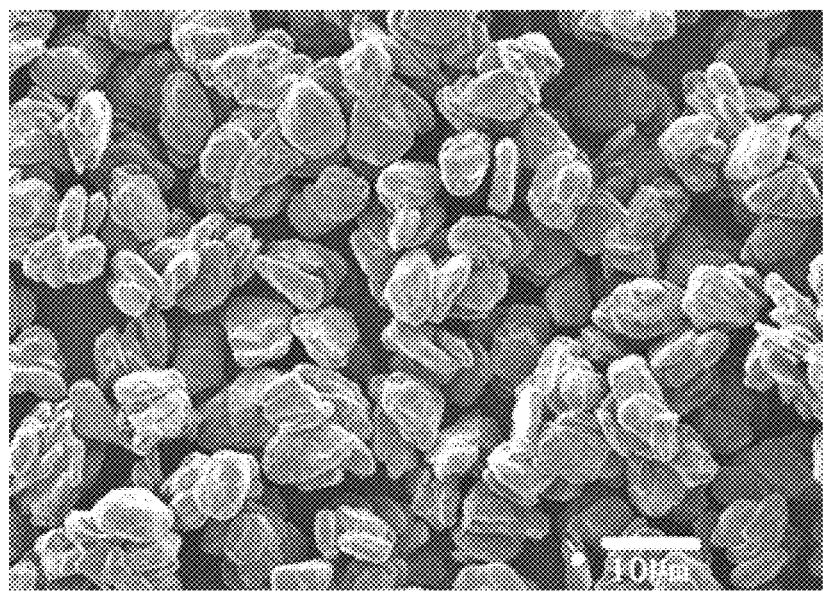

PREPARATION METHOD OF AN ANODE MATERIAL FOR LITHIUM-ION BATTERIES

1. TECHNICAL FIELD

The invention belongs to the technical field of lithium-ion battery materials, in particular to a preparation method of an anode material for lithium-ion batteries.

2. BACKGROUND ART

With the improvement of the energy density and fast charging performance requirements of lithium-ion batteries, it is required that the anode material for lithium-ion batteries has high energy density and the fast charging performance of the material should also be improved. At present, the market-oriented anode materials are mainly made of artificial graphite, the actual specific capacity is about 350-360 mAh/g, the charging rate is 1C-5C, and the first-time efficiency is 92-94%, which cannot meet the requirements of the next generation of high-energy-density and fast-charging batteries. In order to improve the energy density and fast charging performance of graphite materials, amorphous carbon materials with good isotropy, small aggregate particle size and large coating amount are generally selected, but the selection of raw materials is limited, and the market-oriented low-impedance raw materials have been basically screened and the impedance has not been significantly reduced, therefore, it is necessary to increase the diffusion rate of ions during the charging and discharging process and reduce the electronic impedance through the doping of the graphite core and the doping of its outer shell coating layer, so as to improve the power performance; at the same time, doping coating can also improve the first-time efficiency of the material, indirectly increase the capacity per gram of positive electrode of the battery, and increase the energy density. At present, most of the graphite materials doped and coated are materials with high electronic or ionic conductivity such as amorphous carbon, nitrogen, boron and the conductive agent, oxide and the solid electrolyte. For example, Chinese Patent Application No. 202011383817.3 discloses a graphite coating material and a preparation method thereof, the negative electrode of the battery is doped with tantalum doped lithium lanthanum zirconium oxide and conductive materials in the surface coating layer of graphite, which effectively improve the transmission rate and diffusion coefficient of lithium ions, so that the conductive material can effectively improve the electronic conductivity of the material; the tantalum doped lithium lanthanum zirconium oxide, amorphous carbon and conductive materials in the shell synergistically exhibit good lithium ion conductivity and electronic conductivity, which is beneficial to improve the ion transmission rate and conductivity of the graphite coating material, and can effectively improve the rate capability, safety performance and cycle performance of graphite anode materials, but there are defects such as low first-time efficiency and insignificant improvement in power performance.

3. SUMMARY OF THE INVENTION

The object of the invention is to overcome the above shortcomings and provide a preparation method of an anode material for lithium-ion batteries that can improve the first-time efficiency and power performance of the graphite composite material.

A preparation method of an anode material for lithium-ion batteries of the invention, comprising the following steps:

(1) Dispersing tetrabutyl titanate in glycerol solvent to prepare 1~5 wt % solution and adding hexadecyl trimethyl ammonium bromide solution with the concentration of 12 g/L, adding tetramethylammonium hydroxide to adjust Ph to be 9-10, mixing uniformly; then adding 1 wt % ammonium fluoride solution, mixing uniformly and then transferring to a hydrothermal reactor, heating at 150-200° C. for 1~6 h, the product was centrifuged, and washed with ethanol and water for 10 times, and dried in a vacuum drying oven at 60° C. for 12 h to obtain titanium/nitrogen/fluorine-doped porous titanium dioxide;

Wherein: the mass ratio of tetrabutyl titanate:hexadecyl trimethyl ammonium bromide:hydroxide:ammonium fluoride is 1:20~40:0.1~1:0.5~2;

(2) Preparing 1~10 wt % mass concentration of titanium/nitrogen/fluorine-doped porous titanium dioxide organic solution, and then adding 1~10 wt % mass concentration of lithium salt solution, mixing uniformly, then adding graphite, mixing uniformly, and spray drying to obtain porous lithium titanate-coated graphite composites; wherein: the mass ratio of titanium/nitrogen/fluorine-doped porous titanium dioxide: lithium salt:graphite is 1~10:1~10:100;

(3) Weighing porous lithium titanate-coated graphite composites and ammonium fluoride in a mass ratio of 100:1~10, placing them in a tube furnace, wherein the ammonium fluoride is located in the upstream direction of the gas flow, and heated at 400° C. for 2 h under the protection of argon, then heated to 800° C. for carbonization for 6 h to obtain nitrogen-fluorine co-doped lithium titanate/graphite composites, that is, anode material of lithium-ion battery.

A preparation method of an anode material for lithium-ion batteries mentioned above, the lithium salt in the step (2) is one of lithium carbonate, lithium hydroxide, lithium chloride, lithium bromide, lithium iodide or lithium sulfide.

Compared with the prior art, the invention has obvious advantageous effects, it can be seen from the above technical scheme that the invention first improves its impedance and reduces its defects by doping nitrogen and fluorine to the lithium titanate precursor titanium dioxide to provide the basis for the formation of porous lithium titanate; and further improve the structure of lithium titanate by doping the material with nitrogen and fluorine atoms again after forming lithium titanate to reduce the defects in the process of forming lithium titanate. In this way, the core is twice coated with nitrogen and fluorine atoms to obtain porous lithium titanate, and coated on the surface of the core, thereby improving the first-time efficiency and power performance of the graphite composite material.

4. BRIEF DESCRIPTION OF ACCOMPANY DRAWINGS

FIG. 1 is the SEM diagram of lithium titanate/graphite composites obtained in Embodiment 1;

5. SPECIFIC EMBODIMENT OF THE INVENTION

Embodiment 1

A preparation method of an anode material for lithium-ion batteries, comprising the following steps:

(1) Dispersing 1 g tetrabutyl titanate in 50 ml glycerol solvent to prepare 2 wt % solution and adding 30 ml hexadecyl trimethyl ammonium bromide solution with the concentration of 12 g/L (adding 0.5 mL tetramethylammonium hydroxide to adjust Ph=9), mixing uniformly; then adding 100 g, 1 wt % ammonium fluoride solution, mixing uniformly and then transferring to a hydrothermal reactor, heating at 180° C. for 3 h, the product was centrifuged (1000 r/min, 1 h), and washed with ethanol and water for 10 times, and dried in a vacuum drying oven at 60° C. for 12 h to obtain titanium/nitrogen/fluorine-doped porous titanium dioxide;

(2) Adding 5 g titanium/nitrogen/fluorine-doped porous titanium dioxide to 100 ml carbon tetrachloride solution to prepare 5 wt % mass concentration of titanium/nitrogen/fluorine-doped porous titanium dioxide solution, and then adding 100 ml, 5 wt % mass concentration of lithium carbonate solution, mixing uniformly, then adding 100 g artificial graphite, mixing uniformly, and spray drying to obtain porous lithium titanate-coated graphite composites;

(3) Weighing 100 g porous lithium titanate-coated graphite composites and 5 g ammonium fluoride, placing them in a tube furnace, wherein the ammonium fluoride is located in the upstream direction of the gas flow, and heated at 400° C. for 2 h under the protection of argon, then heated to 800° C. for carbonization for 6 h to obtain nitrogen-fluorine co-doped lithium titanate/graphite composites, that is, anode material of lithium-ion battery.

Embodiment 2

A preparation method of an anode material for lithium-ion batteries, comprising the following steps:
(1) Dispersing 1 g tetrabutyl titanate in 100 ml glycerol solvent to prepare 1 wt % solution and adding 20 ml hexadecyl trimethyl ammonium bromide solution with the concentration of 12 g/L (adding 0.1 ml tetramethylammonium hydroxide to adjust Ph), mixing uniformly; then adding 50 ml, 1 wt % ammonium fluoride solution, mixing uniformly and then transferring to a hydrothermal reactor, heating at 150° C. for 6 h, the product was centrifuged (1000 r/min, 1 h), and washed with ethanol and water for 10 times, and dried in a vacuum drying oven at 60° C. for 12 h to obtain titanium/nitrogen/fluorine-doped porous titanium dioxide;

(2) Adding 1 g titanium/nitrogen/fluorine-doped porous titanium dioxide to 100 ml carbon tetrachloride solution to prepare 1 wt % mass concentration of titanium/nitrogen/fluorine-doped porous titanium dioxide solution, and then adding 100 ml, 1 wt % mass concentration of lithium hydroxide solution, mixing uniformly, then adding 100 g artificial graphite, mixing uniformly, and spray drying to obtain porous lithium titanate-coated graphite composites;

(3) Weighing 100 g porous lithium titanate-coated graphite composites and 1 g ammonium fluoride, placing them in a tube furnace, wherein the ammonium fluoride is located in the upstream direction of the gas flow, and heated at 400° C. for 2 h under the protection of argon, then heated to 800° C. for carbonization for 6 h to obtain nitrogen-fluorine co-doped lithium titanate/graphite composites, that is, anode material of lithium-ion battery.

Embodiment 3

A preparation method of an anode material for lithium-ion batteries, comprising the following steps:
(1) Dispersing 1 g tetrabutyl titanate in 20 ml glycerol solvent to prepare 5 wt % solution and adding 40 ml hexadecyl trimethyl ammonium bromide solution with the concentration of 12 g/L (adding 1 ml tetramethylammonium hydroxide to adjust Ph), mixing uniformly; then adding 200 ml, 1 wt % ammonium fluoride solution, mixing uniformly and then transferring to a hydrothermal reactor, heating at 200° C. for 1 h, the product was centrifuged (1000 r/min, 1 h), and washed with ethanol and water for 10 times, and dried in a vacuum drying oven at 60° C. for 12 h to obtain titanium/nitrogen/fluorine-doped porous titanium dioxide;

(2) Adding 10 g titanium/nitrogen/fluorine-doped porous titanium dioxide to 100 ml carbon tetrachloride solution to prepare 10 wt % mass concentration of titanium/nitrogen/fluorine-doped porous titanium dioxide solution, and then adding 100 ml, 10 wt % lithium chloride, mixing uniformly, then adding 100 g artificial graphite, mixing uniformly, and spray drying to obtain porous lithium titanate-coated graphite composites;

(3) Weighing 100 g porous lithium titanate-coated graphite composites and 10 g ammonium fluoride in a mass ratio of 100:1-10, placing them in a tube furnace, wherein the ammonium fluoride is located in the upstream direction of the gas flow, and heated at 400° C. for 2 h under the protection of argon, then heated to 800° C. for carbonization for 6 h to obtain nitrogen-fluorine co-doped lithium titanate/graphite composites, that is, anode material of lithium-ion battery.

The Comparative Example

Adding 5 g phenol-formaldehyde resin to 100 ml carbon tetrachloride solution to prepare 5 wt % mass concentration of resin solution, then adding 100 g artificial graphite, mixing uniformly, and spray drying to obtain hard carbon-coated graphite composites B; then heating to 800° C. for carbonization for 6 h to obtain graphite composites.

1. Physical and Chemical Performance Test 1.1 SEM Test

The lithium titanate/graphite composites prepared in Embodiment 1 was tested by SEM, and the test result is shown in FIG. 1. It can be seen from FIG. 1 that the composites prepared in Embodiment 1 is granular, with uniform size distribution, and the particle size is between 8 and 15 μm.

1.2 Powder Conductivity Test:

The powder was pressed into the block structure, and then the resistivity of the powder was tested with a four-probe tester. The test results are shown in Table 1.

1.3 Powder Compaction Density Test

The powder compaction density test was performed on the composites prepared in Embodiment 1-3 and the comparative example. During the test, weighing a certain mass of powder and placing it in the mold, and pressing it with a pressure of 2T (using a powder compaction density tester, placing 1 g powder in a fixed kettle and pressing it with a pressure of 2T, resting for 10S, and then calculating the volume size under pressing, and calculating the compacted density), and calculating the powder compacted density. The test results are shown in Table 1.

TABLE 1

| project | powder resistivity($\Omega \cdot m$) | powder compacted density($g/cm^3$) | specific surface area ($m^2/g$) |
|---|---|---|---|
| Embodiment 1 | $6 \times 10^{-7}$ | 1.69 | 2.32 |
| Embodiment 2 | $5 \times 10^{-7}$ | 1.67 | 2.11 |
| Embodiment 3 | $3 \times 10^{-7}$ | 1.65 | 1.94 |
| comparative example | $8 \times 10^{-6}$ | 1.54 | 1.45 |

It can be seen from Table 1, the powder resistivity of the graphite composites prepared in Embodiment 1-3 is significantly lower than that of the comparative examples. The reason is that the surface of the material is coated with nitrogen, fluorine to improve the compaction density of the material, and nitrogen reduces the electronic resistance of the material. At the same time, the porous structure increases the specific surface area of the material.

2. Button Battery Test

Assembling lithium titanate/graphite composites in Embodiment 1-3 and the comparative example into button batteries A1, A2, A3 and B1 respectively. The assembling method is as follows: adding binder, conductive agent and solvent to the anode material, stirring to make the slurry, coating it on the copper foil, drying and rolling to obtain the negative electrode sheet. The binder used is LA132 binder, the conductive agent is SP, the anode material is the lithium titanate/graphite composites in Embodiment 1-3 and the comparative example, and the solvent is secondary distilled water. The ratio of each component is that anode material: SP:LA132:secondary distilled water=95 g:1 g:4 g:220 mL; the electrolyte is $LiPF_6$/EC+DEC (the concentration of $LiPF_6$ is 1.2 mol/L, and the volume ratio of EC and DEC is 1:1), the lithium metal sheet is used as the counter electrode, and the diaphragm is made of polyethylene (PE), polypropylene (PP) or polyethylene propylene (PEP) composite film. The assemblies of button batteries were carried out in an argon-filled glove box, and the electrochemical performance test was carried out on a Wuhan LAND CT2001A battery tester with a charge-discharge voltage range of 0.005V to 2.0V and a charge-discharge rate of 0.1C. The test results are shown in Table 2.

At the same time, the above-mentioned negative electrode sheets were taken to test the abilities of solution uptake and reservation of the electrode sheets. The results are shown in Table 2.

TABLE 2

Comparison of the abilities of solution uptake of the button batteries and their electrode sheets between embodiments and the comparative example.

| project | first-time discharge capacity (mAh/g) | first-time efficiency (%) | ability of solution uptake (mL/min) |
|---|---|---|---|
| Embodiment 1/A1 | 361.3 | 97.3 | 9.8 |
| Embodiment 2/A2 | 359.4 | 96.9 | 9.3 |
| Embodiment 3/A3 | 359.5 | 96.7 | 8.8 |
| comparative example 1/B1 | 352.4 | 92.2 | 3.4 |

It can be seen from Table 2, the first-time discharge capacity, first-time charge and discharge efficiency, and ability of solution uptake of the lithium-ion batteries of the graphite composite anode materials obtained in Embodiment 1-3 are significantly higher than those of the comparative example. The reason is that the high specific surface area of the embodiments improves the ability of solution uptake of the electrode sheet, at the same time, the lithium titanate in the outer layer reduces its irreversible loss and improves the first-time efficiency.

3. Pouch Battery Test

Using the graphite composites in Embodiment 1-3 and the comparative example as the negative electrode material to prepare the negative electrode sheet. Using ternary material ($LiNi_{1/3}Co_{1/3}Mn_{1/3}O_2$) as positive electrode, using $LiPF_6$ solution (solvent is EC+DEC, volume ratio is 1:1, concentration of $LiPF_6$ is 1.3 mol/L) as electrolyte, celegard2400 as diaphragm, preparing 2Ah pouch batteries A10, A20, A30 and B10, B20. Then, testing the cycle performance and rate performance of the pouch batteries.

Rate performance test conditions: charge rate: 1C/2C/3C/5C, discharge rate 1C; voltage range: 2.8-4.2V.

The cycle test conditions: 1C/1C, 2.8-4.2V, temperature: 25±3° C., cycle times: 500 cycles.

The test results are shown in Table 3.

TABLE 3

Comparison of constant current ratio and cycle performance between the embodiments and the comparative example

| rate performance | constant current ratio(%) | | | | cycle performance (500 cycles, retention rate) |
|---|---|---|---|---|---|
| | 1 C | 2 C | 3 C | 5 C | |
| Embodiment 1/A1 | 100 | 96.3 | 90.1 | 85.5 | 97.8% |
| Embodiment 2/A2 | 100 | 95.8 | 88.9 | 84.1 | 97.6% |
| Embodiment 3/A3 | 100 | 95.4 | 88.3 | 83.9 | 97.4% |
| comparative example 1/B1 | 100 | 90.1 | 82.4 | 73.5 | 93.1% |

It can be seen from Table 3 that the pouch batteries prepared by the lithium titanate/graphite composites prepared in Embodiment 1-3 of the invention have better constant current ratios, and the constant current ratios of the comparative example are significantly reduced. Because the porous lithium titanate with lithium-ion conductivity is coated on the surface of materials in the embodiments to improve the ion transmission rate, nitrogen and fluorine improve the electron transmission rate of the materials, thereby improving the rate performance of the battery, and the porous lithium titanate has a large layer spacing and stable structure, which improves the cycle performance of the materials.

The above are only preferred embodiments of the invention and are not intended to limit the invention. Any modification, equivalent replacement, improvement, etc. made within the spirit and principle of the invention shall be included in the protection scope of the invention.

The invention claimed is:

1. A preparation method of an anode material for lithium-ion batteries, comprising following steps:
    (1) Dispersing tetrabutyl titanate in glycerol solvent to prepare 1~5 wt % solution and adding hexadecyl trimethyl ammonium bromide solution with the concentration of 12 g/L, adding tetramethylammonium hydroxide to adjust PH to be 9-10, mixing uniformly; then adding 1 wt % ammonium fluoride solution, mixing uniformly and then transferring to a hydrothermal reactor, heating at 150-200° C. for 1~6 h, the product was centrifuged, and washed with ethanol and water for 10 times, and dried in a vacuum drying oven at 60° C. for 12 h to obtain titanium/nitrogen/fluorine-doped porous titanium dioxide;

Wherein: the mass ratio of tetrabutyl titanate:hexadecyl trimethyl ammonium bromide:tetramethylammonium hydroxide:ammonium fluoride is 1:20~40: 0.1~1:0.5~2;

(2) Preparing 1~10 wt % mass concentration of titanium/nitrogen/fluorine-doped porous titanium dioxide organic solution, and then adding 1~10 wt % mass concentration of lithium salt solution, mixing uniformly, then adding graphite, mixing uniformly, and spray drying to obtain porous lithium titanate-coated graphite composites; wherein: the mass ratio of titanium/nitrogen/fluorine-doped porous titanium dioxide: lithium salt:graphite is 1~10:1~10:100;

(3) Weighing porous lithium titanate-coated graphite composites and ammonium fluoride in a mass ratio of 100:1~10, placing them in a tube furnace, wherein the ammonium fluoride is located in the upstream direction of the gas flow, and heated at 400° C. for 2 h under the protection of argon, then heated to 800° C. for carbonization for 6 h to obtain nitrogen-fluorine co-doped lithium titanate/graphite composites.

2. The preparation method of an anode material for lithium-ion batteries of claim 1, the lithium salt in the step (2) is one of lithium carbonate, lithium hydroxide, lithium chloride, lithium bromide, lithium iodide or lithium sulfide.

* * * * *